Patented Aug. 18, 1953

2,649,399

UNITED STATES PATENT OFFICE 2,649,399

CONJUGATED OESTROGENIC QUATERNARY AMMONIUM SALTS AND THEIR PREPARATION

Desmond Beall and Gordon Allison Grant, Montreal, Quebec, Canada, assignors to Ayerst, McKenna & Harrison, Limited, St. Laurent, Quebec, Canada, a corporation of Canada No Drawing. Application February 1, 1951, Serial No. 208,976

2 Claims. (Cl. 167—74.5)

The present invention relates to new quaternary ammonium salts of the oestrogenic conjugates derived from urine or urinary liquids and to a method for their preparation.

Prior art

It is known that unhydrolyzed equine urinary material contains oestrogenic conjugates which are useful therapeutic agents. Individually these oestrogenic conjugates react with organic nitrogenous bases, for example, aniline, to form the corresponding basic salt. When reacting these organic nitrogenous bases with urinary materials containing the oestrogenic conjugates the salts formed are soluble in the urinary liquid and the basic salt of the oestrogenic conjugates thus formed may then be isolated from the urinary liquid by extraction with a selective solvent, for example, chloroform.

Applicants' development

In accordance with the present invention, it has now been found that the oestrogenic conjugates contained in urine or urinary liquid can be isolated in the form of new water-insoluble salts by reacting said urinary liquid with p-diisobutyl-phenoxy-ethoxy-ethyl dimethyl benzyl ammonium chloride. The salts formed are the p-diisobutyl-phenoxy-ethoxy-ethyl dimethyl benzyl ammonium salts of oestrogenic conjugates.

The process of the present invention is carried out by reacting equine urine or a concentrate thereof with p-diisobutyl-phenoxy-ethoxy-ethyl dimethyl benzyl ammonium chloride to form a precipitate which contains the p-diisobutyl-phenoxy-ethoxy-ethyl dimethyl benzyl ammonium salts of the oestrogenic conjugates of the starting material. The precipitate is separated from the reaction mixture and the oestrogenic conjugates may then be derived therefrom.

Example

The present invention will be more fully understood by referring to the following example to illustrate the process rather than to limit the invention.

100 cc. of fresh urine were treated with a solution of 500 mg. of p-diisobutyl-phenoxy-ethoxy-ethyl dimethyl benzyl ammonium chloride in 20 cc. of water. The mixture was stirred and the precipitate centrifuged. When assayed it was found that the precipitate contained 90% of the original oestrogenic potency of the urine, as determined by the Marrian-Kober colorimetric test.

We claim:

1. As a new composition of matter a mixture of the p-diisobutyl-phenoxy-ethoxy-ethyl dimethyl benzyl ammonium salts of substantially all of the estrogenic conjugates of unhydrolyzed equine urine, precipitated from an aqueous medium containing said conjugated estrogens in the presence of non-estrogenic urinary materials substantially free of inert non-urinary materials.

2. A process for the preparation of the p-diisobutyl-phenoxy-ethoxy-ethyl dimethyl benzyl ammonium salts of substantially all of the estrogenic conjugates of equine urinary material, comprising reacting an equine urinary liquid containing substantially all of said estrogenic conjugates in the presence of non-estrogenic urinary materials with an aqueous solution of p-diisobutyl-phenoxy-ethoxy-ethyl dimethyl benzyl ammonium chloride thereby to form the water-insoluble p-diisobutyl-phenoxy-ethoxy-ethyl dimethyl benzyl ammonium salts of the estrogenic conjugates of the equine urinary material and separating the precipitate from the mixture substantially free of non-urinary material.

DESMOND BEALL.
GORDON ALLISON GRANT.

References Cited in the file of this patent

UNITED STATES PATENTS

| Number | Name | Date |
|---|---|---|
| 2,055,083 | Klein et al. | Sept. 22, 1936 |
| 2,429,398 | Cook et al. | Oct. 21, 1947 |
| 2,534,121 | Grant et al. | Dec. 12, 1950 |
| 2,550,914 | Cunkelman et al. | May 1, 1951 |
| 2,555,579 | Deans | June 5, 1951 |

OTHER REFERENCES

Pincus, "The Hormones," volume 1, 1948, Academic Press Incorporated, New York City, page 381.

Trussell, "Trichromonas Vaginalis," Charles C. Thomas, published Springfield, Illinois. Ed. I, 1947, page 26.

Lesser article in Drug and Cosmetic Industries, volume 64, Number 5, May 1949, page 632.